C. P. McMULLEN.
STEAM AND LIQUID PRESSURE REGULATING DEVICE.
APPLICATION FILED NOV. 28, 1908.
946,613.
Patented Jan. 18, 1910.
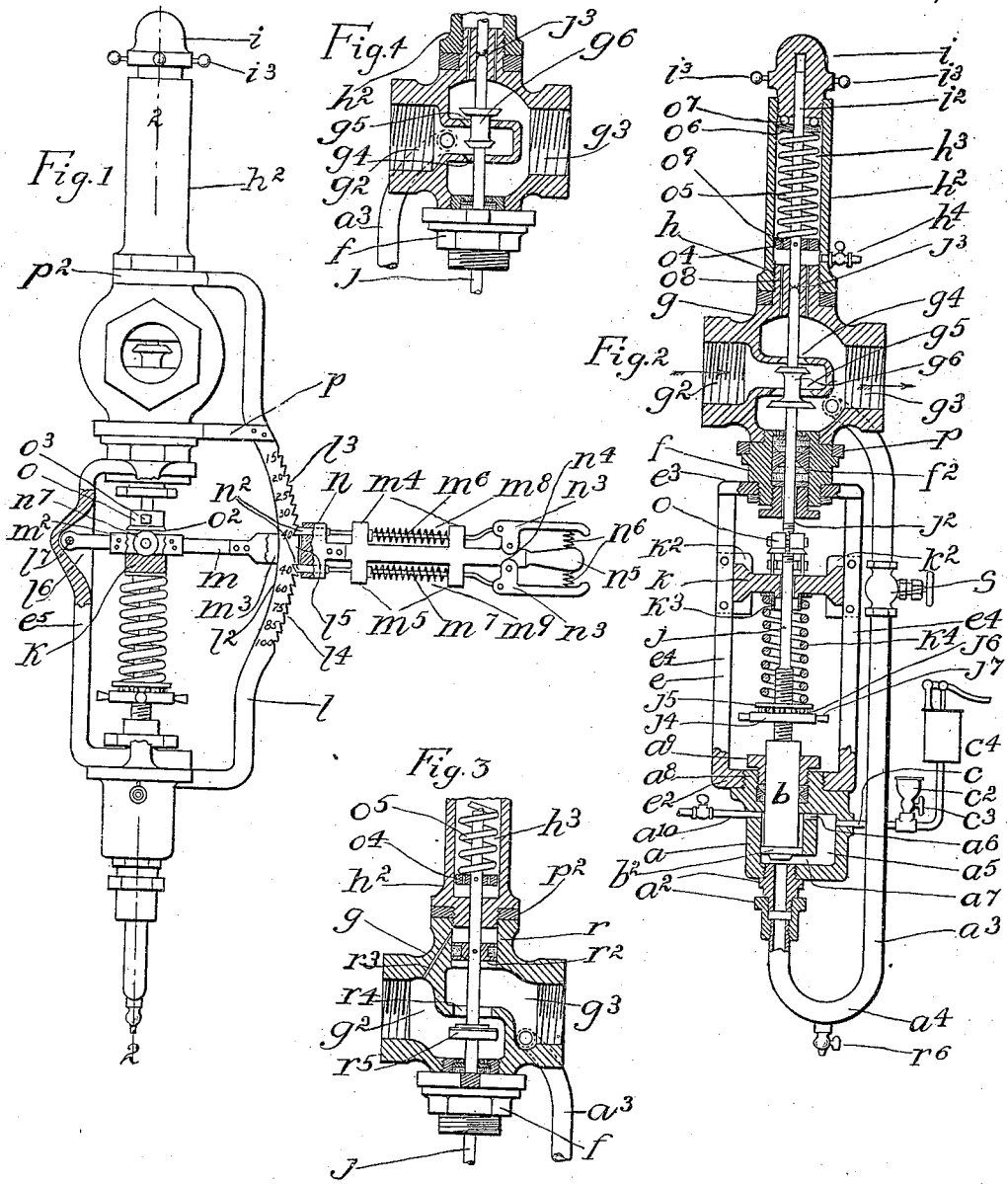

UNITED STATES PATENT OFFICE.

CHARLES P. McMULLEN, OF NEW YORK, N. Y.

STEAM AND LIQUID PRESSURE REGULATING DEVICE.

946,613.  Specification of Letters Patent.  Patented Jan. 18, 1910.

Application filed November 28, 1908. Serial No. 464,905.

*To all whom it may concern:*

Be it known that I, CHARLES P. McMULLEN, a citizen of the United States, and residing at New York, in the county of New York and State of New York, have invented certain new and useful Improvements in Steam and Liquid Pressure Regulating Devices, of which the following is a specification, such as will enable those skilled in the art to which it appertains to make and use the same.

This invention relates to pressure regulating devices for use in connection with and as part of the governors of steam pumps, and also for use as liquid pressure regulating devices in other forms of apparatus; and the object thereof is to provide an improved device or apparatus of this class which is automatic in operation and simple in construction.

A further object of the invention is to provide a steam and liquid pressure regulating device or apparatus particularly designed for use as a governor for steam pumps, but which may be used in other forms of apparatus, and which involves a throttle valve device having high and low pressure sides and through which the steam or liquid passes, together with a pressure cylinder having a piston in operative connection with the throttle valve device and operated in one direction by the pressure of steam or liquid passing through said throttle valve device, and in the opposite direction by mechanical devices, the low pressure side of the throttle valve device being in communication with the pressure cylinder; and with these and other objects in view the invention consists in a device or apparatus of the class specified constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a side elevation of my improved steam and liquid pressure regulating device, part of the construction being in section, Fig. 2 a central vertical sectional view on the line 2—2 of Fig. 1 and showing the device designed for use as a steam pressure regulator and governor for steam pumps, Fig. 3 a view similar to Fig. 2 but showing only the throttle valve device and the form thereof employed when my improvement is used as a liquid pressure regulator in other forms of apparatus, and Fig. 4 a view similar to Fig. 2 but showing a modification.

This invention in as far as it is applicable as a governor for pumping engines is an improvement on governors of this class described and claimed in U. S. Letters Patent granted to me Nov. 8, 1904, No. 774,266, and reissued Jan. 10, 1905, No. 12,302; also in Letters Patent of the United States granted to me Jan. 23, 1906, No. 810,666; July 9, 1907, No. 859,327 and July 9, 1907, No. 859,407; and said invention in this use thereof is more particularly an improvement on that described and claimed in an application for Letters Patent of the United States filed by me June 30, 1908, Ser. No. 441,186 automatic steam pump governors, which application was allowed Nov. 18, 1908.

In as far as this invention is applicable to liquid pressure regulating devices in apparatus other than steam pump governors and similar devices, it is the same as that described and claimed in an application for Letters Patent of the United States filed by me Oct. 15, 1908, Ser. No. 457,797, fire extinguishing apparatus.

In Figs. 1 and 2 of the accompanying drawing my improvement is shown as a steam pressure regulator for use as a governor for steam pumps, and in said figures I have shown at $a$ a pressure cylinder, and at $g$ the throttle valve device.

The cylinder $a$ is provided at its lower end with coupling devices $a^2$ with which, in practice, is connected a pipe $a^3$, the upper end of which is connected with the low pressure side of the throttle valve device $g$, and the lower end of which is connected with the lower end of the cylinder $a$ by means of the coupling devices $a^2$, and the lower end portion of said pipe is also preferably formed into a trap $a^4$.

The cylinder $a$ is provided with a differential piston $b$, the lower end portion $b^2$ of which, in the construction shown, snugly fits said cylinder, and the upper end portion of which is smaller than the lower end portion, and in one side wall of the cylinder $a$ is a by-pass $a^5$ which communicates with the body portion of the cylinder at $a^6$ and with the bottom end thereof at $a^7$.

Connected with the cylinder $a$ is an oil supply pipe $c$ with which is connected an oil cup $c^2$ between which and the pipe is a valve $c^3$, and a force pump $c^4$ is also connected with the pipe c, and in practice oil is placed in the cup $c^2$ and allowed to flow into the pipe c and into the by-pass $a^5$, after which the valve $c^3$ is closed and the oil may be forced into the cylinder a so as to maintain a supply of lubricating material therein without stopping the pump or interfering with the operation thereof, and by means of the trap $a^4$ a body of oil may be maintained at all times in the lower end of the cylinder, or in said trap from which it may be forced into the cylinder by pressure from the low pressure side of the throttle valve device g.

The top part of the cylinder a is provided with a stuffing box $a^8$ closed by a gland $a^9$, and the top part of the piston b passes upwardly through said gland and is movable therethrough. The top part of the cylinder a is also provided with a discharge or vent device $a^{10}$ which is in communication with the top portion of the cylinder. Connected with the top portion of the cylinder a is a yoke or frame e comprising a bottom member $e^2$, a top member $e^3$, parallel side members $e^4$ and a back member $e^5$ parallel with said side members. Connected with the top of the frame e is a bonnet f containing a stuffing box $f^2$, and the stuffing box $a^8$ at the top of the cylinder a, and the stuffing box $f^2$ are of the same style and construction as the stuffing boxes described and claimed in U. S. Letters Patent, No. 859,327 and No. 859,407 granted to me July 9, 1907. The cylinder a, the frame e and the bonnet f are arranged vertically as shown, and the throttle valve device g is connected with the top of the bonnet f.

The throttle valve device g comprises a casing of well known form and having a high pressure inlet side $g^2$ and a low pressure outlet side $g^3$, and in practice the inlet side $g^2$ is connected with a steam boiler or other steam supply in the usual manner, and the pumping engine is connected with the low pressure side $g^3$ of said throttle valve device. The throttle valve device g is provided with two ports or passages $g^4$ and $g^5$ forming corresponding valve seats, and the upper port or passage $g^4$ is smaller than the lower port or passage $g^5$.

The top of the casing of the throttle valve device is provided with a screw threaded nipple h with which is connected a tubular casing $h^2$ forming a spring chamber $h^3$, and the top of the casing $h^2$ is closed by a screw threaded plug i having a central bore or passage $i^2$, and the plug i is provided with handles $i^3$ by which it may be manipulated, and the bottom part of the spring chamber $h^3$ is preferably provided with a drain device $h^4$.

Connected with the top of the piston b is a rod j which extends longitudinally and centrally through the frame e, the stuffing box $f^2$, the throttle valve device g, the tubular casing $h^2$ and into the bore $i^2$ of the plug i. In the form of construction shown this rod is composed of three parts, the bottom and middle parts being connected at $j^2$, and the middle and top parts abutting at $j^3$ where they pass through the nipple h, and said rod is provided where it passes through the valve casing of the throttle valve device g with a double headed valve $g^6$ adapted to open and close both the ports or passages $g^4$ and $g^5$, and the top part of said valve is smaller than the lower part thereof. The bottom part of the rod j is enlarged and screw threaded as shown in Figs. 1 and 2, and mounted thereon is a spring tension regulating nut $j^4$ above which is mounted a disk $j^5$ through which the rod j loosely passes, and between the disk $j^5$ and the nut $j^4$ are placed ball bearings $j^6$, and said nut is provided with handles $j^7$ by which it may be manipulated.

Mounted in the yoke or frame e is a cross head k and the side portions $e^4$ of said yoke or frame are provided with guides $k^2$ in which said cross head is vertically movable, and the rod j passes loosely through said cross head, and connected with the bottom of said cross head is a tube or sleeve $k^3$, and mounted between said cross head and the disk $j^5$ is a spiral spring $k^4$, and the tube or sleeve $k^3$ extends downwardly into said spring and serves to hold it in proper position under all conditions. At the front of the yoke or frame e and connected with the top of the cylinder a and with the top of the throttle valve casing g is a bar l having a segmental central portion $l^2$ provided with ratchet teeth $l^3$ and $l^4$, the upper ratchet teeth $l^3$ extending upwardly and the lower ratchet teeth $l^4$ extending downwardly, and between the teeth $l^3$ and $l^4$ is a blank space $l^5$. The back bar $e^5$ of the yoke or frame e is provided with a socket or recess $l^6$ in which is pivoted at $l^7$ a lever m which carries a yoke-shaped frame $m^2$ which forms a part thereof and through which the rod j passes, and said lever is also provided with another yoke-shaped device $m^3$ through which the segmental part $l^2$ of the bar l passes. The lever m is also provided outwardly of the yoke-shaped device $m^3$ with top and bottom guides $m^4$ and $m^5$ through which are passed top and bottom rods $m^6$ and $m^7$ on which are mounted springs $m^8$ and $m^9$, and mounted on the outer end portions of the yoke-shaped device $m^3$ is a keeper n. The ends of the rods $m^6$ and $m^7$ are provided with dogs $n^2$ which are adapted to engage the teeth $l^3$ and $l^4$, and connected with the outer ends of the rods $m^6$ and $m^7$ are bell cranks $n^3$ which are pivoted to the lever m at $n^4$, and said lever is provided at its outer end with a handle $n^5$ between which and the ends of the bell cranks $n^3$ are placed springs $n^6$. The lever m is also provided in the opposite sides of the yoke-shaped device or frame $m^2$ with wheels $n^7$ which are adapted to bear on the cross head $k$, and the separate parts of the rod $j$ are connected above said lever by a coupling block $o$ provided with a flared base $o^2$ which rests on the wheels $n^7$. The block $o$ is preferably composed of two parts as shown in Fig. 2, and said parts are connected by a bolt $o^3$ which is passed therethrough and between the ends of the bottom and middle parts of the rod $j$.

This construction is shown and described in application for Letters Patent, Ser. No. 441,186 filed by me on the 30th day of June, 1908 and hereinbefore referred to, as are most of the other features of construction shown and described herein except the pipe $a^3$ which connects the low pressure side of the casing of the throttle valve device $g$ with the lower end of the cylinder $a$.

The top part of the rod $j$ is provided just above the nipple $h$ of the throttle valve casing with a disk $o^4$ above which is placed a spiral spring $o^5$ which is weaker than the spring $k^4$, and above which is placed a disk $o^6$ between which and the plug $i$ are placed ball bearings $o^7$, and the tension of the spring $o^5$ may be regulated at any time by turning said plug, and the tension of the spring $k^4$ may be regulated by turning the nut $j^4$.

The nipple $h$ of the casing of the throttle valve device $g$ is provided, in the construction shown, with ports $o^8$ forming a communication between said throttle valve casing and the spring chamber $h^3$, and the disk $o^4$ is also preferably provided with ports $o^9$.

The bar $l$ containing the segmental rack or ratchet tooth member $l^2$ is provided with a brace $p$ by which it is connected with the bottom portion of the throttle valve casing $g$, and a headed member $p^2$ by which it is connected with the top of said valve casing, and the connection of said bar with the cylinder $a$ or the lower end of the frame $e$ may be made in any desired manner.

The object of the ports or passages $o^8$ in the nipple $h$ of the throttle valve casing and the ports or passages $o^9$ in the disk $o^4$ is to provide for a free circulation through the spring chamber $h^3$. It will be understood, of course, that any pressure in the spring chamber $h^3$ will not interfere with the operation of the spring therein, nor with the operation of the governor in any way; and the ports or passages $o^8$ enable the spring chamber $h^3$ to free or drain itself when the valve casing $g$ is closed. This drainage taking place through the outlet end $g^3$ leading to the pump.

The operation of this apparatus will be the same as that of the apparatus described and claimed in the patents hereinbefore referred to. When the apparatus is in operation the steam from the boiler passes into the throttle valve casing at $g^2$ and passes out at $g^3$ and is conveyed to the pump which is not shown. In the use of apparatus of this class the pump is always set to act under a predetermined pressure, and if at any time, for any reason, there is an increase of this pressure beyond the desired point the steam in the discharge end of the throttle valve casing $g$ will pass through the pipe $a^3$ and the piston $b$ will be operated and the throttle valve casing closed, and the moment that the over pressure is reduced the springs $k^4$ and $o^5$ will reopen the valve in the throttle valve casing and this operation is automatic at all times.

The lower end of the cylinder $a^2$ and the trap $a^4$ contains at all times a body of oil, as hereinbefore described, the object of which is to lubricate the cylinder and piston and prevent corrosion and keep said parts in proper operative condition.

It will be understood that the springs $k^4$ and $o^5$ operate to hold the valve in the throttle valve casing open at all times, and the tension of these springs is regulated according to the pressure desired on the pump. If a low pressure is required say up to from 20 to 35 pounds or thereabout the spring $o^5$ only is used, and the tension of this spring can be regulated at all times by means of the screw threaded plug $i$. If the pump be set to work say at 30 pounds pressure or thereabout the piston $b$ and spring $o^5$ will operate to control the flow of steam through the valve casing $g$ in order to accomplish this result without the aid of the spring $k^4$. If it is desired to work the pump on a higher pressure say from 40 to 150 pounds or higher still, the bottom spring $k^4$ is brought into operation in addition to the spring $o^5$. The control of the spring $k^4$ is effected both by means of the nut $j^4$ and by the lever $m$. The position of the lever $m$ shown in Fig. 1 is its normal position, or that in which the spring $k^4$ is not operated and in which the pump is controlled by the spring $o^5$ only. If now, it is desired to increase the pressure on the pump the bell cranks $n^3$ are operated to withdraw the dogs $n^2$ from their engagement with the ratchet teeth 13 and 14, and the outer end of said lever is depressed to the desired extent, the degree of the downward movement thereof being controlled or indicated by scale numbers on the quadrant or rack bar 12.

The bottom dog $n^2$ will lock the lever $m$ in any desired position below the horizontal, and in this way the spring $k^4$ may be compressed quickly or instantly so as to change the pressure on the pump immediately and said pressure will be maintained as long as the lever $m$ is left in its depressed position.

If the regulation of the spring $k^4$ is not sufficiently exact when the lever $m$ is thrown into operation as above described, the nut $j^4$ may be operated to exactly regulate the tension of said spring to any desired extent. If at any time it becomes necessary to cut off entirely the flow of steam to the pump, either by reason of the breakage in the pipe connections, water or steam hose connections, or any other part of the apparatus the lever $m$, as will be understood, will be moved upwardly so as to force the valve rod $j$ upwardly and cause the valve $g^6$ to cut off the flow of steam through the throttle valve device or valve casing $g$, and the lever $m$ may be locked in this position by the upper dog $n^2$.

In the downward movement of the lever $m$ as above described, the wheels $n^7$ bear on the cross head $k$, and this facilitates the operation of the said lever and of said cross head and reduces the friction, and in the upward movement of said lever in order to cut off the flow of steam through the throttle valve device or casing the wheels $n^7$ bear on the flanged nut $o$ for the same purpose.

In the operation as described, there is always a body of oil in the lower end of the cylinder $a$, and in the coupling members $a^2$ and in the adjacent leg of the trap $a^4$ of the pipe $a^3$ and this body of oil is held in position by water of condensation or other water or liquid in the pipe $a^3$, and the said oil is thus always in position for use in the cylinder $a$ and is forced thereinto by pressure in said pipe, and the trap $a^4$ is provided with a drain device $r^6$ by which it may be drained or cleaned whenever desired.

The object of making the nut $o$ in two parts is to facilitate the detachment or disconnection of the separate parts of the rod $j$ and the separate parts of the governor, when the same becomes necessary and also the assembling of said parts; and the object of dividing the upper portion of the rod $j$ into two parts as shown in Fig. 2 is to provide means whereby governors of this class already installed may be easily repaired while in place, or the improvements described and claimed herein applied thereto.

Although I have described this form of my improved governor as particularly adapted for use in connection with a pump for pumping water, it will be apparent that the same may be used in connection with a pump used for pumping any other liquid, air, gas or similar substance under pressure, and my improvement may be applied in connection with any apparatus of this class used for any purpose.

In Fig. 3 I have shown a form of throttle valve device which may be substituted for that shown in Fig. 2, and which is particularly designed for use to control water or other liquid pressure in various forms of apparatus, one of which is shown and described in an application for a patent on a fire extinguishing apparatus, No. 457,797, filed by me Oct. 15, 1908, and hereinbefore referred to. With this form of construction the upper end portion of the throttle valve casing $g$ is provided with a supplemental cylinder $r$ which is in communication with the discharge end or side of the valve casing, and the rod $j$ is provided with a piston $r^2$ movable in said cylinder, and said valve casing is also provided with a single port or passage $r^4$. The inlet side of the valve casing is also provided with a by-pass $r^3$ which communicates with the upper end portion of said cylinder, and the rod $j$ with a single valve $r^5$ which is placed below said port or passage. In the operation of this form of construction water or other liquid under high pressure is supposed to pass through the throttle valve casing, and the operation will be substantially the same as with the construction shown in Figs. 1 and 2 when steam or other gaseous or vaporous substances are passed therethrough.

The construction shown in Fig. 4 is a modification of that shown in Fig. 2, the difference being that the valve ports or passages $g^4$ and $g^5$ are reversed as is also the valve $g^6$, the pipe $a^3$ being connected with the high pressure side of the valve casing, and with this form of construction the operation will be substantially the same as with that shown in Fig. 2.

In practice water may be admitted to the trap $a^4$ through the oil pipe connection $c$ to form a seal and support a body of oil in or adjacent to the lower end of the cylinder $a$ at all times, and the pipe $a^3$ may be provided with a valve $s$ by means of which the communication between the throttle valve casing and the lower end of the cylinder $a$ may be cut off, if desired, at any time or for any purpose.

It will be understood that with the construction shown in Figs. 2 and 3 the springs $o^5$ and $k^4$ operate to open the valve, and with the construction shown in Fig. 4 said springs operate to close it.

Although I have shown and described two springs for operating the valve in the throttle valve casing and the piston $b$ in one direction my invention, in this instance, is not limited to the number of springs employed for this purpose, and various other changes in and modifications of the construction herein described may be made, within the scope of the appended claims, without departing from the spirit of my invention or sacrificing its advantages.

Having fully described my invention, what I claim as new and desire to secure by Letters Patent, is;—

1. In a fluid pressure regulator, a throttle valve device comprising a casing having inlet and outlet sides, a cylinder connected with said casing and provided with a piston, a valve rod connected with said piston and passing through said throttle valve device and provided with a valve adapted to close the passage therethrough, the casing of the throttle valve device being provided opposite said first named cylinder with a supplemental cylinder in communication with the outlet side of the throttle valve casing, a piston mounted on the valve rod and movable in the supplemental cylinder, the outer end of the first named cylinder being in communication with one side of the throttle valve device whereby pressure from said device will move the piston to close the valve therein, and tensional devices for moving said piston in the opposite direction to open said valve.

2. In a fluid pressure regulator, a throttle valve device having inlet and outlet sides, a cylinder connected with said valve device, a piston mounted in said cylinder and provided with a rod which passes through the valve device, a valve connected with said rod within said valve device and adapted to control the passage therethrough and normally open, a pipe forming a communication between one side of said valve device and the outer end of the cylinder whereby pressure from the valve device will move the piston in a direction to close the valve therein, a tensional device operating to hold said valve in an open position under low pressure conditions, and a supplemental tensional device operating in connection with the first named tensional device under high pressure conditions.

3. In a fluid pressure regulator, a throttle valve device having inlet and outlet sides, a cylinder connected with said valve device, a piston mounted in said cylinder and provided with a rod which passes through the valve device, a valve connected with said rod within said valve device and adapted to control the passage therethrough and normally open, a pipe forming a communication between one side of said valve device and the outer end of the cylinder whereby pressure from the valve device will move the piston in a direction to close the valve therein, a tensional device operating to hold said valve in an open position under low pressure conditions, a supplemental tensional device operating in connection with the first named tensional device under high pressure conditions, and means for regulating said tensional devices.

4. In a fluid pressure regulator, a throttle valve device having inlet and outlet sides, a cylinder connected with said valve device, a piston mounted in said cylinder and provided with a rod which passes through the valve device, a valve connected with said rod within said valve device and adapted to control the passage therethrough and normally open, a pipe forming a communication between one side of said valve device and the outer end of the cylinder whereby pressure from the valve device will move the piston in a direction to close the valve therein, a tensional device operating to hold said valve in an open position under low pressure conditions, a supplemental tensional device operating in connection with the first named tensional device under high pressure conditions, means for regulating said tensional devices, and means for locking the valve of the throttle valve device in a closed position.

In testimony that I claim the foregoing as my invention I have signed my name in presence of the subscribing witnesses this 27th day of November 1908.

CHARLES P. McMULLEN.

Witnesses:
A. R. APPLEMAN,
C. E. MULREANY.